US010621768B2

(12) United States Patent
Verma (10) Patent No.: US 10,621,768 B2
(45) Date of Patent: Apr. 14, 2020

(54) AUGMENTED REALITY AND VIRTUAL REALITY ENGINE AT THE OBJECT LEVEL FOR VIRTUAL DESKTOP INFRASTUCTURE

(71) Applicant: VMWARE, INC., Palo Alto, CA (US)

(72) Inventor: Shubham Verma, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 30 days.

(21) Appl. No.: 15/900,816

(22) Filed: Feb. 21, 2018

(65) Prior Publication Data

US 2019/0213767 A1 Jul. 11, 2019

(30) Foreign Application Priority Data

Jan. 9, 2018 (IN) .............................. 201841000977

(51) Int. Cl.
*G06Q 10/10* (2012.01)
*G06T 11/60* (2006.01)
*H04L 29/06* (2006.01)

(52) U.S. Cl.
CPC .............. *G06T 11/60* (2013.01); *G06Q 10/10* (2013.01); *H04L 67/38* (2013.01); *H04L 67/42* (2013.01)

(58) Field of Classification Search
CPC ......... G06T 19/006; G06T 9/00; G06T 15/00; G06F 9/45541
USPC ........................................................ 345/633
See application file for complete search history.

(56) References Cited

U.S. PATENT DOCUMENTS

| 6,898,307 | B1 | 5/2005 | Harrington |
| 8,141,090 | B1 | 3/2012 | Graupner et al. |
| 8,200,796 | B1* | 6/2012 | Margulis ............... G06F 3/1431 709/217 |
| 2001/0012393 | A1 | 8/2001 | Yonezawa |
| 2002/0126751 | A1 | 9/2002 | Scheurich et al. |
| 2011/0299776 | A1 | 12/2011 | Lee et al. |
| 2015/0042553 | A1* | 2/2015 | Mecham ................. G09G 3/003 345/156 |
| 2015/0235432 | A1* | 8/2015 | Bronder ................ G06T 19/006 345/633 |
| 2016/0292832 | A1 | 10/2016 | Bogan |
| 2017/0085656 | A1* | 3/2017 | Abbott .................... H04L 67/18 |
| 2017/0270582 | A1 | 9/2017 | Forss |
| 2017/0272545 | A1 | 9/2017 | Kwon et al. |

(Continued)

*Primary Examiner* — Thomas J Lett
(74) *Attorney, Agent, or Firm* — Patterson & Sheridan, LLP (57) ABSTRACT

Embodiments of the present disclosure relate to techniques for providing an augmented reality experience. Certain embodiments involve receiving a request from an application to register a context for detection, wherein the context for detection comprises an artifact and a context identifier. Some embodiments involve sending the context for detection to a registration component. The registration component may register the context for detection. Certain embodiments involve receiving context detection information from a client device. Some embodiments involve sending a notification to the application that the context detection information was received. Certain embodiments involve receiving application content and a relative pose of the application content from the application. Some embodiments involve composing a scene based on the application content and the relative pose of the application content and transporting, by the computing device, the scene to the client device.

20 Claims, 6 Drawing Sheets

(56) References Cited

U.S. PATENT DOCUMENTS

| | | |
|---|---|---|
| 2017/0287221 A1 | 10/2017 | Ghaly et al. |
| 2017/0352192 A1* | 12/2017 | Petrovskaya ......... G06T 19/006 |
| 2018/0095542 A1 | 4/2018 | Mallinson |
| 2018/0308199 A1* | 10/2018 | Vembu ...................... G06T 1/20 |
| 2018/0343179 A1 | 11/2018 | Vanblon et al. |
| 2019/0130645 A1* | 5/2019 | Verma ................... G06T 19/006 |
| 2019/0147658 A1 | 5/2019 | Kurabayashi |

* cited by examiner

AUGMENTED REALITY AND VIRTUAL REALITY ENGINE AT THE OBJECT LEVEL FOR VIRTUAL DESKTOP INFRASTUCTURE

RELATED APPLICATIONS

Benefit is claimed under 35U.S.C. 119(a)-(d) to Foreign Application Serial No. 201841000977 filed in India entitled "AUGMENTED REALITY AND VIRTUAL REALITY ENGINE AT THE OBJECT LEVEL FOR VIRTUAL DESKTOP INFRASTRUCTURE", on Jan. 9, 2018, by VMware, Inc., which is herein incorporated in its entirety by reference for all purposes.

BACKGROUND

Users typically interact with applications running on computing devices (e.g., desktop and laptop computers, mobile phones, tablets, and the like) using input devices such as keyboards, mice, and touch-screens, and output is usually provided to users through display devices such as monitors. Due to the inherent limitations in these forms of input and output, emerging technologies such as virtual reality (VR) and augmented reality (AR) involve the expansion of input and output methods.

Virtual reality (VR) technologies generally involve the computer-implemented simulation of up to a 360-degree experience which a user views using, for example, a wearable display (e.g., VR goggles). Augmented reality (AR) technologies generally involve the real-time addition of simulated content into a real-life scene being captured by a user device (e.g., a camera), which the user views through a display device, such that the simulated content appears through the display device to be present in the real-life scene. In both VR and AR technologies, users may provide input through traditional input methods (e.g., keyboards, mice, touchscreens, audio, and the like) as well as through movements and gestures (e.g., captured by motion sensors, cameras, and the like).

While the potential uses for VR and AR technologies are many and varied, there is currently only a limited number of computing applications which support these technologies. Due to the resource limitations of individual VR and AR devices (e.g., VR/AR wearable displays or mobile phones used to view VR and AR experiences may have limited computing resources), many types of applications may be too resource-intensive to efficiently support VR and AR functionality for such devices. Without access to VR and AR functionality, users of many computing applications may choose to purchase larger computer monitors and/or multiple computer monitors in order to expand the display area. Because of the limitations and costs associated with computer monitors and other traditional input and output devices, there exists a need for alternative methods of expanding the input and output capabilities of computing applications which, for various reasons, do not offer native support for VR and AR technologies.

DETAILED DESCRIPTION

Embodiments presented herein relate to techniques for providing a virtual reality (VR) and/or augmented reality (AR) experience. In certain embodiments, aspects of processing associated with the VR/AR experience may be performed on one or more computing devices (e.g., a server) or entities separate from the client device through which the user views the VR/AR content (e.g., VR or AR goggles/glasses, mobile phones, and the like), and separate from an application with which the user interacts through VR/AR using the client device. This independent, remote processing allows for the VR/AR engine to run more efficiently, not being limited to the resources of the client device, and to be compatible with applications which do not offer native VR/AR support. For example, a user may wish to use VR/AR functionality to access a particular application which involves heavy resource usage and may not offer native VR/AR support (e.g., a virtualization application which provides virtual machines). According to embodiments of the present disclosure, a scene detected by a client device may be augmented with particular objects from an application (e.g., individual components within a user interface of the application, such as text boxes, graphics, and the like). For example, the application (e.g., a virtualization application or remote desktop application) may request the detection of a particular context (such as the presence of a certain object or artifact) in a scene (e.g., a user's environment) so that, when the context is detected, certain content from the application may be used to augment the scene. For example, embodiments of the present disclosure may allow one or more contexts for detection to be registered (e.g., at the request of one or more applications) so that one or more client devices (e.g., VR/AR-capable devices) which interact with the one or more applications may search for and detect the one or more registered contexts for detection. In certain embodiments, a client device may prompt a user to approve a context for detection (e.g., at the time the context for detection is registered).

According to embodiments, a VR/AR engine may acquire real-time image data from a client device, captured using a sensor such as a camera of the client device. The VR/AR engine may also acquire input from various other sensors (e.g., accelerometer, gyrometer, magnetometer, global position system (GPS), and the like). If the client device comprises a wearable AR display, for example, real-time images of the user's surroundings may be captured by a camera associated with the wearable AR display and provided to the VR/AR engine so that contexts (e.g., including artifacts) may be detected and augmentation may be performed. In alternative embodiments, the client device may perform processing to detect contexts.

The VR/AR engine may perform pre-processing on the images (e.g., resizing, removing noise, and the like), and then proceed to detecting and extracting features from the images. For example, the VR/AR engine may identify a particular artifact such as a piece of paper with some pattern printed on it (in case of marker-based detection) or some relevant context-specific object like a computer numeric control (CNC) machine or car's engine (in case of markerless detection), in the scene so that the artifact can be "augmented" with content such as the execution screen of a virtual desktop or application running on the virtualized infrastructure. For example, VR/AR engine may detect a context which has been registered as a context for detection (e.g., at the request of an application). In some embodiments, contexts (e.g., artifacts) may be detected in a scene and transformed using homography, which is a method of finding the geometrical transform between two planar images. If the scene image is too shaky to detect features, the image may be stabilized first. Once an artifact specified in a registered context has been detected and extracted (e.g., a bounding box has been drawn around the artifact), the VR/AR engine may provide a notification to a VR/AR manager including information about the detection of the context (e.g., an identifier associated with the context and a pose of the detected artifact). The VR/AR manager may notify the application that the context has been detected, and the application may provide application content (e.g., a text box from the virtual desktop) so that the application content may be added onto the scene in which the artifact was detected. In certain embodiments, the application also provides a relative pose of the application content (e.g., coordinates for the application content relative to an origin or to the artifact in the scene), and VR/AR manager may compose a scene containing the application content based on the relative pose of the application contents received from one or more applications.

In some embodiments, VR/AR manager (or another component, such as the VR/AR engine) may perform a warp operation in order to modify the perspective of the application content (e.g., if the application content is to be placed onto an artifact, the perspective of the application content may be warped so that it will match that of the artifact on which it is to be added) when generating the scene. VR/AR manager may then generate a mask for the application content in order to augment the scene image with the application content. The application content with the mask may be copied onto the scene image, and the final image may be rendered and output to the client device for display. This process may be performed on an ongoing basis (e.g., so that the application content continues to track with the artifact as it moves in the scene image in real-time as the pose of the application content are defined relative to the artifact).

VR/AR manager may then provide the scene to the client device for display to the user (e.g., as an augmented reality experience in which the application content is projected onto the user's environment at the relative pose specified by the application).

Figure 1:
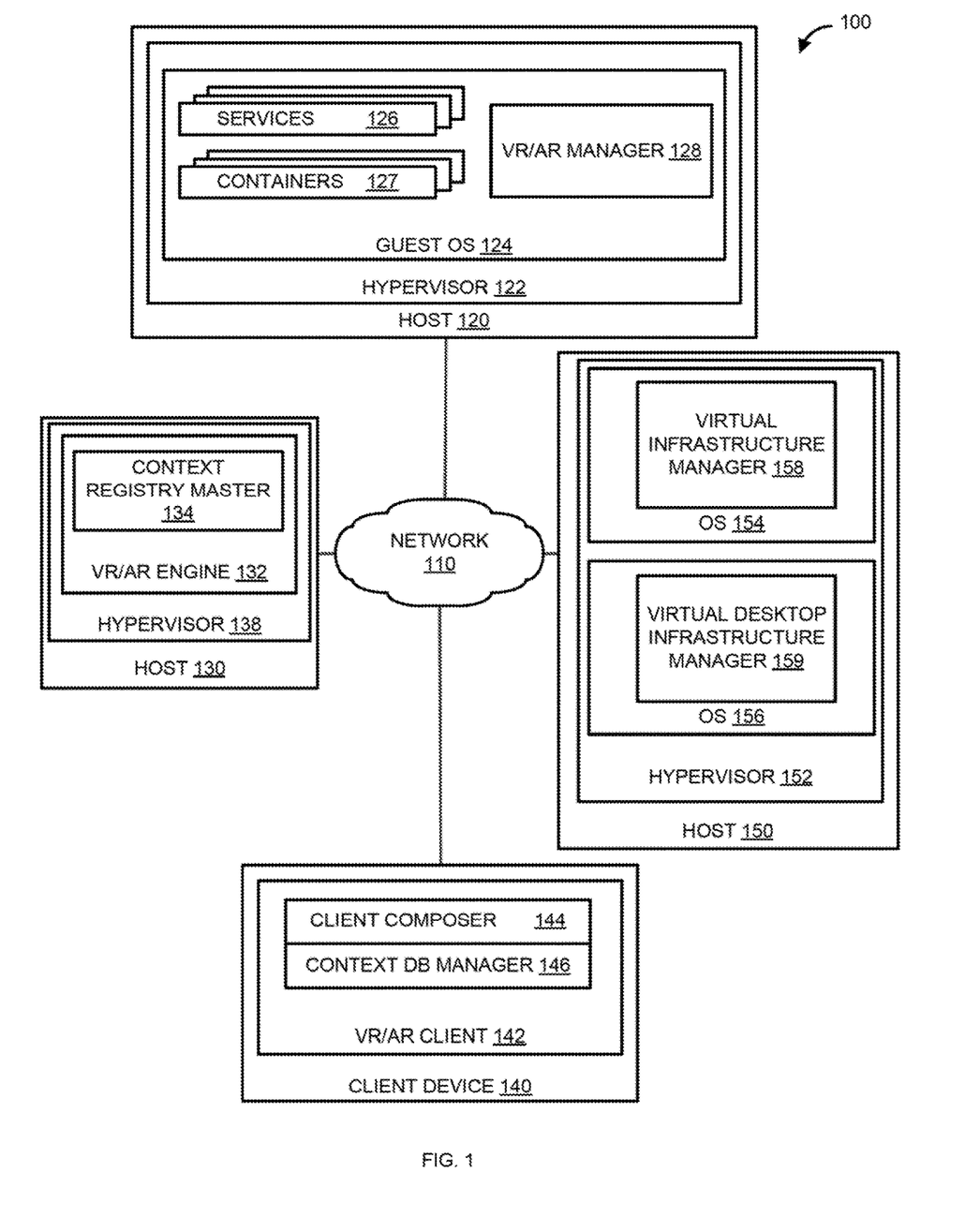
FIG. 1 illustrates components of an example computing environment in which an embodiment may be implemented.

FIG. 1 illustrates components of a computing environment 100 in which embodiments of the present disclosure may be implemented. As shown, system 100 includes host 120, host 130, client device 140, and host 150, connected by network 110 (e.g., the internet). Hosts 120, 130, and 150 may comprise physical or virtual computing devices (e.g., servers) which are connected to network 110. While three hosts, 120, 130, and 150 are depicted, there may be any number of hosts in computing environment 100. Client device 140 may comprise a computing device such as a desktop or laptop computer, mobile phone, tablet computer, or a virtual realty or augmented reality device (e.g., VR goggles, wearable AR display, etc.).

Host 120 comprises a hypervisor 122, which comprises a guest Operating System (OS) 12. Guest OS 124 runs one or more services 126, which may, for example, comprise one or more web services or native libraries with both kernel-mode and user-mode components accessed by client device 140 via VR/AR client 142. User-mode components, on request to retrieve a screen buffer, may either request the dedicated kernel-mode component or invoke pre-built components/drivers of the operating system. For example, VR/AR client 142 may comprise an interface (e.g., a browser or other local software interface, such as a VR/AR software application) through which a user of client device 140 accesses a service 126. In one embodiment, the service 126 may comprise a virtualization program through which the user provisions, manages, and accesses virtual machines. While services 126 are depicted as being located on a single host 120, services 126 may also comprise one or more distributed services which are distributed across a plurality of computing devices.

Guest OS 124 also comprises one or more containers 127, which may comprise, for example, containerized applications, such as big data analytics or number-crunching services (e.g., financial, healthcare, analytics, and the like). Containers 127 may also be accessed by client device 140 in a similar manner to that described above with respect to services 126.

Guest OS 124 further comprises VR/AR manager 128, which may perform operations related to providing a virtual reality or augmented reality experience at the object level, as described herein. For example, VR/AR manager 128 (the components of which are described in more detail with respect to FIG. 2) may receive a request from one of services 126 or containers 127 to register a context for detection. In one example, a service 126 may send the request when it has content (e.g., a notification) to add to a scene as part of an augmented reality experience when a certain context is detected (e.g., a notification is to be displayed in the air when a particular artifact, such as a car, is detected in the user's environment by one or more sensors associated with client device 140). The request to register the context for detection may comprise, for example, context information, such as a context identifier, an image of the context, a context scope (e.g., specifying whether the context is private such that only one application will be notified when the context is detected, public such that all applications will be notified when the context is detected, or limited to a pool of specified applications which will be notified when the context is detected), and/or other descriptive data. VR/AR manager 128 may register the context to be detected by sending the context information to context registry master 134, which may store the context information in a registry and forward the context information to a client device (e.g., client device 140) to be detected.

VR/AR manager 128 may receive a notification from client device 140 (or from VR/AR engine 132) when the context has been detected, and may receive context detection information comprising, for example, the context identifier and a detected pose of one or more artifacts defined in the context. The detected pose may, for example, comprise coordinates and orientations of the one or more artifacts in the scene relative to the origin. VR/AR manager 128 may notify the service 126 which requested registration of the context that the context has been detected. The notification may, for example, comprise the context detection information. In response, the service 126 may provide VR/AR manager 128 with application content and a relative pose of the application content. The application content may, for example, comprise a graphical object, a text notification, or the like. The relative pose of the application content may, for example, comprise coordinates of the application content relative to the origin or relative to the one or more artifacts which were detected in the scene. VR/AR manager 128 may compose a scene comprising the application contents from one or more applications based on the relative pose of the respective application contents, and may send the scene to client device 140 to be displayed as an augmented reality experience.

Host 130 comprises a hypervisor 138 comprising a VR/AR engine 132, which may perform functions related to providing a user of client device 140 with a VR or AR experience of a service 126 or an application in a container 127. By implementing VR/AR functionality with VR/AR engine 132 on host 130 (and VR/AR manager 128 on host 120), there may not be a need for a service 126 to natively support VR/AR technology, or for the computing resources of client device 140 to be burdened with all of the processing associated with such functionality. While VR/AR engine 132 is depicted as being located on a single host 130, VR/AR engine 132 may also be distributed across a plurality of computing devices, or may be located on the same computing device as service 122.

In an embodiment, a user may utilize VR/AR client 142 on client device 140 to access a service 126 as a VR/AR experience, and VR/AR engine 132 may act as an intermediary to provide at least a portion of this functionality. For example, client device 140 may use an associated camera to capture real-time images of the real-world environment around client device 140 (e.g., images may be captured at a frame rate and resolution specified by VR/AR engine 132, such as 15 Hz and 640×480) and provide these images to VR/AR engine 132 (e.g., via network 110). VR/AR engine 132 may acquire the images from client device 140 and then perform pre-processing in order to prepare the images for feature detection. In alternative embodiments, client device 140 may perform preprocessing and/or feature detection. Pre-processing of an image may involve, for example, resizing the image (e.g., using bilinear interpolation) and filtering the image (e.g., smoothing, noise removal, and the like). Filtering the image may be accomplished, for example, by a convolution process involving the use of a Gaussian filter. Throughout pre-processing, image data is preferably passed among various functions (e.g., software methods) of VR/AR engine 132 by reference (as opposed to performing a deep copy of the image data) in order to conserve resources. Once VR/AR engine 132 has completed pre-processing, feature detection begins.

A feature refers to a unique characteristic of an image that helps to uniquely identify it. For example, an artifact (e.g., an object, such as a piece of paper) in the scene may be a feature. VR/AR engine 132 may use a feature detection method such as the open-source A-KAZE feature detection program. In some embodiments, VR/AR engine 132 uses homography, which involves finding the geometric transform between two planar images, in the feature detection process. VR/AR engine 132 may calculate homography using random sampling consensus (RANSAC), which comprises an iterative method to estimate parameters of a mathematical model from a set of observed data that contains outliers, the outliers being accorded no influence on the values of the estimates. VR/AR engine 132 may use feature detection to search for a particular artifact in the scene, such as an artifact defined in a context.

VR/AR engine 132 comprises a context registry master 134, which may perform operations related to registering contexts for detection, as described herein. For example, context registry master 134 may receive a context for detection from VR/AR manager 128, and may register the context for detection. Registration may comprise, for example, storing context information (e.g., received from VR/AR manager 128) in a data structure and forwarding the context information to client device 140 (or any other devices which detect contexts). In certain embodiments, context registry master 134 communicates with client device 140 to determine whether a user approves registering the context for detection, and only registers the context for detection when the user approves.

A context may specify one or more artifacts to be detected, and/or other conditions under which augmentation is to be performed (e.g., that augmentation is to be performed when the user is at a certain geographic location, determined using a global positioning system associated with client device 140). In these embodiments, VR/AR engine performs feature detection only if the condition(s) specified by the user are satisfied (e.g., if client device 140 indicates that it is in a particular geographic location).

When VR/AR engine 132 has identified an artifact in the scene to be augmented (e.g., through feature detection), VR/AR engine 132 may draw a bounding box around the detected artifact in the scene image and obtain the coordinates of the bounding box by applying a perspective transform on the artifact using the homography matrix which represents the geometric transform between the scene image and the artifact. The bounding box may be used by VR/AR engine 132 to extract or isolate the artifact from the rest of the scene. The position of the artifact is then tracked for each subsequent image in the scene (e.g., each subsequent frame acquired from the camera of client device 140).

Other methods of detecting and extracting artifacts may be employed as well without departing from the scope of the present disclosure, such as alternative machine learning algorithms.

When VR/AR engine 132 (or, in other embodiments, client device 140) has detected/extracted the artifact specified in the context in the scene, and/or has determined that any necessary conditions specified in the context are satisfied (e.g., client device 140 is in a particular geographic location), VR/AR engine 132 continues with the augmentation process. For example, VR/AR engine 132 may provide context detection information (e.g., the context identifier and a pose of the artifact) to VR/AR manager 128. In response, VR/AR engine 132 may receive a scene from VR/AR manager 128 which includes application content at a particular pose in the scene (e.g., relative to the artifact). VR/AR engine 132 may send the scene to client device 140 to be displayed as a virtual reality or augmented reality experience. In certain embodiments, VR/AR engine 132 performs processing on the scene before sending it to client device 140 for display. For example, VR/AR engine 132 may perform warping on application content in the scene by applying a geometric transform (e.g., perspective transform) to the application content. In some embodiments, the geometric transform is based on the nearest neighbor interpolation technique, which approximates the value of a function for a non-given point in a particular space when given the value of that function in points around (neighboring) that point. Once the application content has been warped appropriately (e.g., to match an orientation of the artifact in the scene), VR/AR engine 132 may generate a binary mask for the application content so that the application content may be appropriately placed in the scene.

VR/AR engine 132 may then produce a final scene by copying the pixel buffer of the warped application content, using the binary mask generated above, to the scene acquired from client device 140. This results in a final scene wherein the application content appears relative to the artifact in the user's environment. In certain embodiments, VR/AR engine 132 continuously tracks the coordinate frame of the artifact as subsequent scene images are acquired (e.g., from the camera on client device 140) and augments it with application content (e.g., warped application content received in a scene from VR/AR manager 128). The final scene may be rendered by VR/AR engine 132 and provided to client device 140 so that the user may view the augmented reality experience. For example, if client device 140 comprises a wearable VR display, the user's environment will appear through the wearable display to be augmented with the application content (e.g., a notification from the service 126) being overlaid on the artifact (e.g., an object in the user's environment), moving with the artifact as it is moves in the user's environment. Alternatively, the application content may be placed relative to another point in the user's environment, such as an origin of a detected artifact.

In certain embodiments, VR/AR engine 132 may interact with a virtual infrastructure manager 158 (like vCenter), connected over network 110, to perform a variety of actions on a virtual machine on host 120 through client device 140 (e.g., using input such as gestures), such as suspending, starting, stopping, taking a snapshot, taking a screenshot, triggering migration, creating templates, and sharing the virtual machine. In alternative embodiments, some processing attributed to VR/AR engine 132 or VR/AR manager 128 above may be instead performed by client device 140 (e.g., by VR/AR client 142). For example, warping and/or rendering tasks may be performed by client device 140. In some embodiments, the pixel buffer of the application content (e.g., a virtual desktop screen buffer or a notification from a service 126) does not need to be copied to the scene by VR/AR engine 132 or VR/AR manager 128. In these embodiments, the coordinate frame of the bounding box of the artifact is used in order to project the application content onto the origin (e.g., (0,0)) of the coordinate frame by the client device 140 (e.g., augmented reality glasses or mobile phone).

In other embodiments, application content may be projected into a scene relative to a plurality of artifacts or onto a fixed location which is not tied to any artifacts in the user's environment.

In certain embodiments, VR/AR engine 132 may also augment scene images with advertisements. For example, VR/AR engine 132 may acquire one or more advertisements (e.g., from a service 126, an advertisement server or data store, etc.), which may comprise multimedia such as video and images, warp the one or more advertisements (e.g., in a manner similar to that described above with respect to other application content), and add the one or more advertisements to the scenes so that the user will see the one or more advertisements in the final scenes through client device 140. In some embodiments, advertisements may be added on or near an artifact to be augmented with application content. The user may then be able to interact with the one or more advertisements using client device 140, such as through gestures, touch screen, mouse or keyboard. Placing advertisements in a VR or AR space allows for a significant expansion of the display area available for such advertisements.

Client device 140 may comprise a computing device (e.g., desktop or laptop computer, mobile phone, VR/AR headset, or the like) through which a user interacts with one or more services 126 or applications in containers 127 as a VR/AR experience. While a single client device 140 is shown, it is understood that a plurality of client devices may also interact with the one or more services or applications in containers 127 as part of the same or a separate VR/AR experience. Client device 140 comprises a VR/AR client 142, which may comprise an application through which client device 140 interacts with one or more remote services as a VR/AR experience. As shown, VR/AR client 142 comprises a client composer 144 and a context database (DB) manager 146. Client composer 144 may perform options related to composing scenes for display on client device 140. For example, in certain embodiments, client composer 144 may receive application content and a pose of the application content (e.g., from VR/AR manager 128 or VR/AR engine 132), which client composer 144 may add to a scene (e.g., application content such as a graphical object may be added to a scene comprising the user's environment in order to provide an augmented reality experience). In alternative embodiments, such as those described above, application content is added to scenes by other components, such as VR/AR manager 128 or VR/AR engine 132.

In one embodiment, a service 126 notifies VR/AR manager 128 that application content is either static or dynamic. If the application content is static (e.g., graphical properties of the application content, such as visual appearance, shape, texture, reflective properties, and the like do not change with respect to space and time), then VR/AR manager 128 may forward the application content along with a pose received from the service 126 to client composer 144 without adding the application content to the scene. When client composer 144 receives the application content (e.g., when it has a non-empty vector of the application content to be rendered) and the pose of the application content, then it may further augment the scene (e.g., the user's environment) with the application content at the received pose on top of the existing scene. If application content is dynamic, VR/AR manager 128 may add the application content to the scene before forwarding it to VR/AR client 142 (either directly or in cooperation with VR/AR engine 132).

Context DB manager 146 may perform operations related to registering contexts for detection. For example, context DB manager 146 may receive context information from context registry master 134, and may add the context information to a database of contexts for detection. In certain embodiments, context DB manager 146 may request approval from a user of client device 140 before adding the context information to the database. For example, the user may be shown a notification in VR/AR client 142 including the context information and requesting the user's approval to detect the context. If the user approves, context DB manager 146 may add the context information to the database, and VR/AR client 142 may detect the context. If the user does not approve, context DB manager 146 may discard the context information and/or send a notification back to context registry master 134 indicating that the context has not been approved for detection. Context registry master 134 may forward the notification back to VR/AR manager 128, which may notify the service 126 that the context has not been approved for detection by the user of client device 140.

Embodiments of the present disclosure may be useful in a variety of contexts, such as, for example, that of virtual assistants. A virtual assistant (e.g., associated with an operating system) may employ techniques described herein to register contexts for detection and deliver content such as notifications and graphical objects to one or more client devices to be displayed as an augmented reality experience. Furthermore, according to embodiments of the present disclosure, a plurality of client devices may receive and interact with the same application content simultaneously (e.g., users of multiple devices may interact with a graphical model of a car engine provided by a particular application). These embodiments may improve collaboration and allow for new possibilities in the augmented reality and virtual reality space.

Host 150 comprises a hypervisor 152, which supports two operating systems 154 and 156. Operating system 154 comprises a virtual infrastructure manager 158, which may perform operations related to a variety of actions on a virtual machine on host 120 through client device 140 (e.g., using input such as gestures), such as suspending, starting, stopping, taking a snapshot, taking a screenshot, triggering migration, creating templates, and sharing the virtual machine. Operating system 156 comprises a virtual desktop infrastructure manager 159, which may perform operations related to collecting configuration information of virtual desktops on host 120, like user entitlements and desktop protocol preferences (BLAST, PCoIP, etc.). These configurations are used by the VR/AR engine to control the access of AR content (screen of virtual desktop or application running on it) to different users.

In some embodiments, if graphics processing unit (GPU) virtualization support (e.g., NVidia GRID) is available on host 120 or host 130, the solution may use them to execute the accelerated high performance parallel versions of the computer vision and related machine learning routines to provide a better augmented reality experience. This will also make the solution less expensive, as multiple users can share the GPU (which is now virtualized and shared on the datacenter) for their VR/AR content (virtual desktop or application running on it), thereby reducing the overall expenditure of the enterprise.

Figure 2:
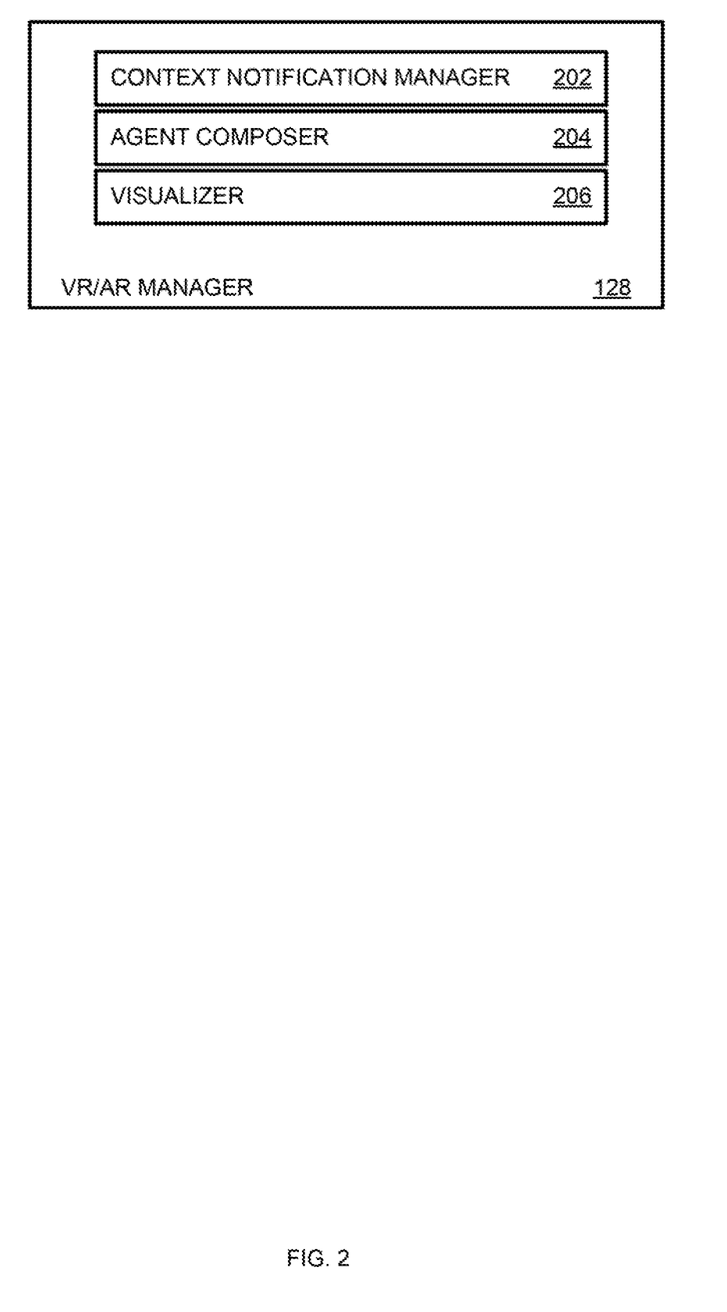
FIG. 2 illustrates components of a virtual reality (VR) and/or augmented reality (AR) manager.

FIG. 2 illustrates components of a virtual reality (VR) and/or augmented reality (AR) manager 128. The components depicted in FIG. 2 are merely exemplary, and the functionality described as being performed by certain components may be performed by any number of local or remote components.

As shown, VR/AR manager 128 comprises context notification manager 202, agent composer 204, and visualizer 206. Context notification manager 202 may perform operations related to registering and receiving information about contexts for detection according to techniques described herein. For example, context notification manager 202 may receive a request from a service 126 to register a context for detection. The request may include context information such as, for example, a context identifier, an image or description of an artifact to be detected, and/or other information about conditions under which augmentation is to be performed (e.g., location information). Context notification manager 202 may forward the context information to context registry master 134, which may register the context for detection. For example, context registry master 134 may forward the context information to context DB manager 146, which may (in some embodiments, upon user approval) store the context information in a database for detection by client device 140. When the context is detected by client device 142 (e.g., in cooperation with VR/AR engine 132), context notification manager 202 may receive context detection information (e.g., a context identifier and a pose of one or more artifacts defined in the context). Context notification manager 202 may notify the service 126 that the context has been detected.

Upon being notified that the context has been detected, the service 126 may send application content and a relative pose (e.g., with respect to an origin or with respect to one or more artifacts) of the application content to agent composer 204. Agent composer 204 may, for example, perform operations related to composing scenes to be provided to client device 140. For example, agent composer 204 may compose a scene comprising the application content at its relative pose. If the relative pose is defined with respect to an artifact defined in the context, agent composer 204 may place the application content in the scene relative to the pose of the artifact (received as part of the context detection information). Otherwise, agent composer 204 may place the application content in the scene relative to the origin. In certain embodiments, if the relative pose does not specify whether it is with respect to the origin or to one or more artifacts, agent composer 204 assumes by default that the relative pose is with respect to the global origin.

Agent composer 204 may receive application content from a plurality of services 126 (and/or applications in containers 127 or other local or remote applications), which agent composer 204 may combine into a single scene. For example, a client device 140 (or a plurality of client devices) may interact with a plurality of services 126 in single augmented reality experience. Agent composer 204 may generate scenes comprising application content from each of the plurality of services 126 so that the user may receive and interact with all of the application content through client device 140.

Once agent composer 204 has composed a scene, it may forward the scene to client device 140. In certain embodiments, agent composer 204 first sends the scene to VR/AR engine 132, which may perform processing on the scene before sending the scene to client device 140 (e.g., for display as an augmented reality experience through VR/AR client 142). Agent composer 204 may continually generate new scenes as the application content changes (e.g., as graphical objects or notifications change or move or as the pose of an artifact to which the application content's pose is connected changes), providing the updated scenes on an ongoing basis to client device 140.

Visualizer 206 may be used to visualize a real-time instantaneous scene being composed by agent composer 204, and may, for example, be used for debugging purposes by application developers. For example, visualizer 206 may output a real-time visualization of the scene as it is composed by agent composer 204, and the visualization may be displayed on a display device associated with host 120 or one or more other local or remote display devices. An application developer may watch the visualization for debugging purposes, such as to ensure that the scene is being composed correctly.

The components of VR/AR manager 128 collectively perform processing related to context registration and real-time augmentation of scene images as they are captured from client device 140 with application content. In alternative embodiments, certain processing and/or rendering tasks associated with augmentation may be performed by any combination of local or remote components, such as VR/AR engine 132 and client composer 144.

Figure 3:
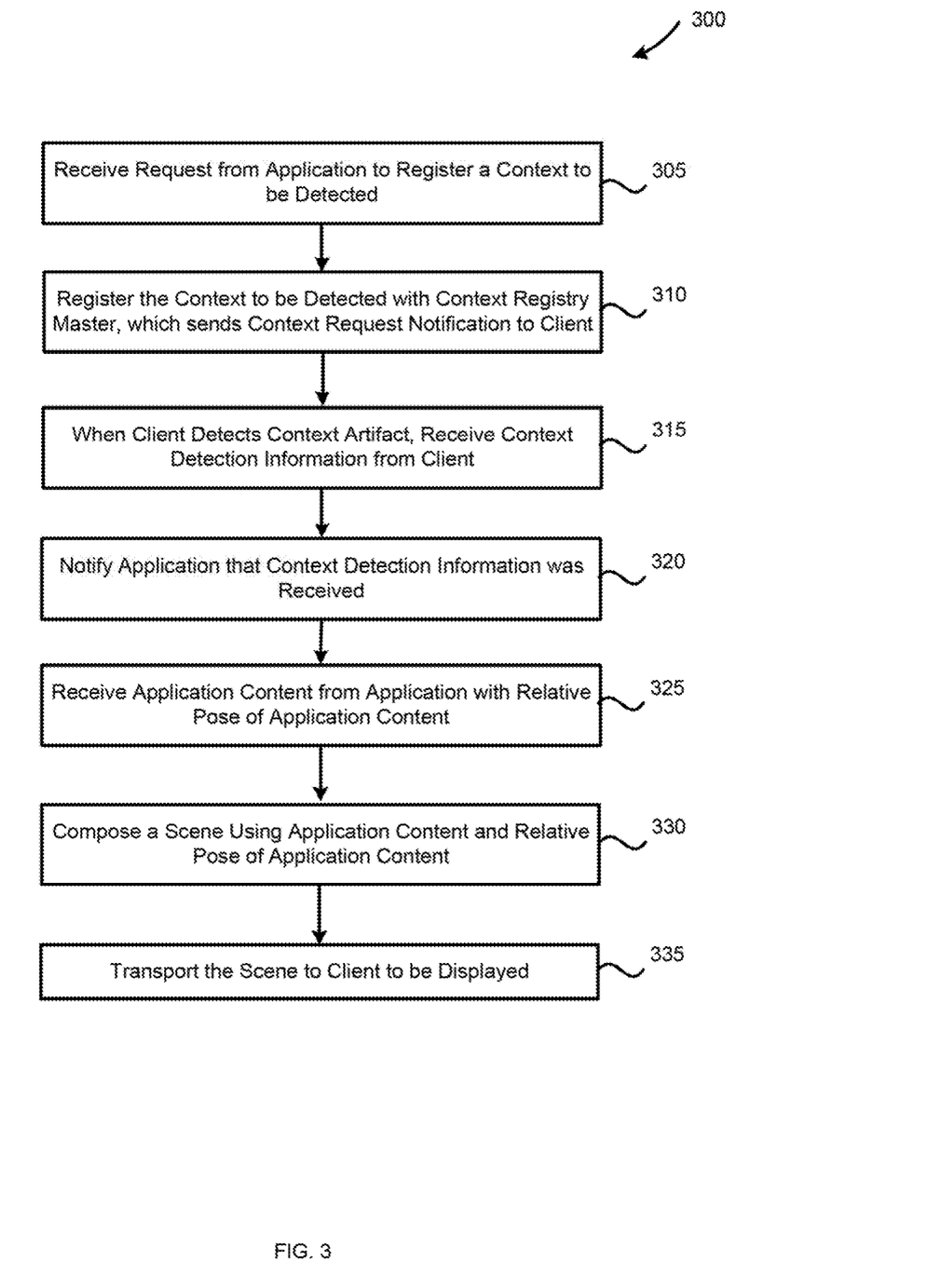
FIG. 3 illustrates example operations for providing a VR/AR experience, according to embodiments of the present disclosure.

FIG. 3 illustrates example operations 300 for providing a VR/AR experience, according to embodiments of the present disclosure.

At 305, VR/AR manager 128 receives a request from an application, such as a service 126, to register a context to be detected. The request may include context information, such as a context identifier and an image and/or description of an artifact to be detected.

At 310, VR/AR manager 128 sends the context information to context registry master 134, which sends a context request notification to client device 140. In certain embodiments, a user of client device 140 may prompted to approve the context for detection in response to receiving the context request notification (e.g., which may comprise the context information).

At 315, when client device 140 has detected the artifact defined in the context, VR/AR manager 128 receives context detection information from the client (or through the mediation of VR/AR engine 128). The context detection information may, for example, comprise the context identifier and a pose of the artifact in the scene.

At 320, VR/AR manager 128 notifies the application (e.g., the service 126) that the context detection information was received. In certain embodiments, if other applications have also requested the context to be detected, VR/AR manager 128 may also notify these other applications that the context detection information was received. VR/AR manager 128 may filter the applications depending on the scope of the context. If the context scope was public, then all the requesting applications will be notified about the detected context, however, if the scope was private to individual application or a group of applications (application pool), then only those particular applications will be notified by the VR/AR manager 128.

At 325, VR/AR manager 128 receives application content and a relative pose of the application content from the application (e.g., the service 126). The application content may, for example, comprise a notification or a graphical object. The relative pose of the application content may, for example, indicate whether it is defined with respect to the global origin or the artifact.

At 330, VR/AR manager 128 composes a scene using the application content and the relative pose of the application content. For example, VR/AR manager 128 may compose a scene comprising the application content placed at the relative pose of the application content with respect to the pose of the artifact in the scene. In certain embodiments, VR/AR manager 128 may also receive application content from other applications, which VR/AR manager 128 may also add to the scene.

At 335, VR/AR manager 128 transports the scene to client device 140 for display to a user as an augmented reality experience. In certain embodiments, the VR/AR manager interacts with the remote desktop manager to use the desktop remoting protocols like BLAST, PCoIP, and the like. The remoting protocol information will be queried from the virtual desktop infrastructure manager 159 over network 110. In certain embodiments, VR/AR manager 128 may first send the scene to VR/AR engine 128, which may perform certain processing and/or rendering tasks on the scene before providing it to client device 140. In some embodiments, client device 140 (e.g., client composer 144) may perform some processing and/or rendering tasks related to the scene (e.g., adding the contents of the scene to an existing scene) before displaying it to the user.

Figure 4:
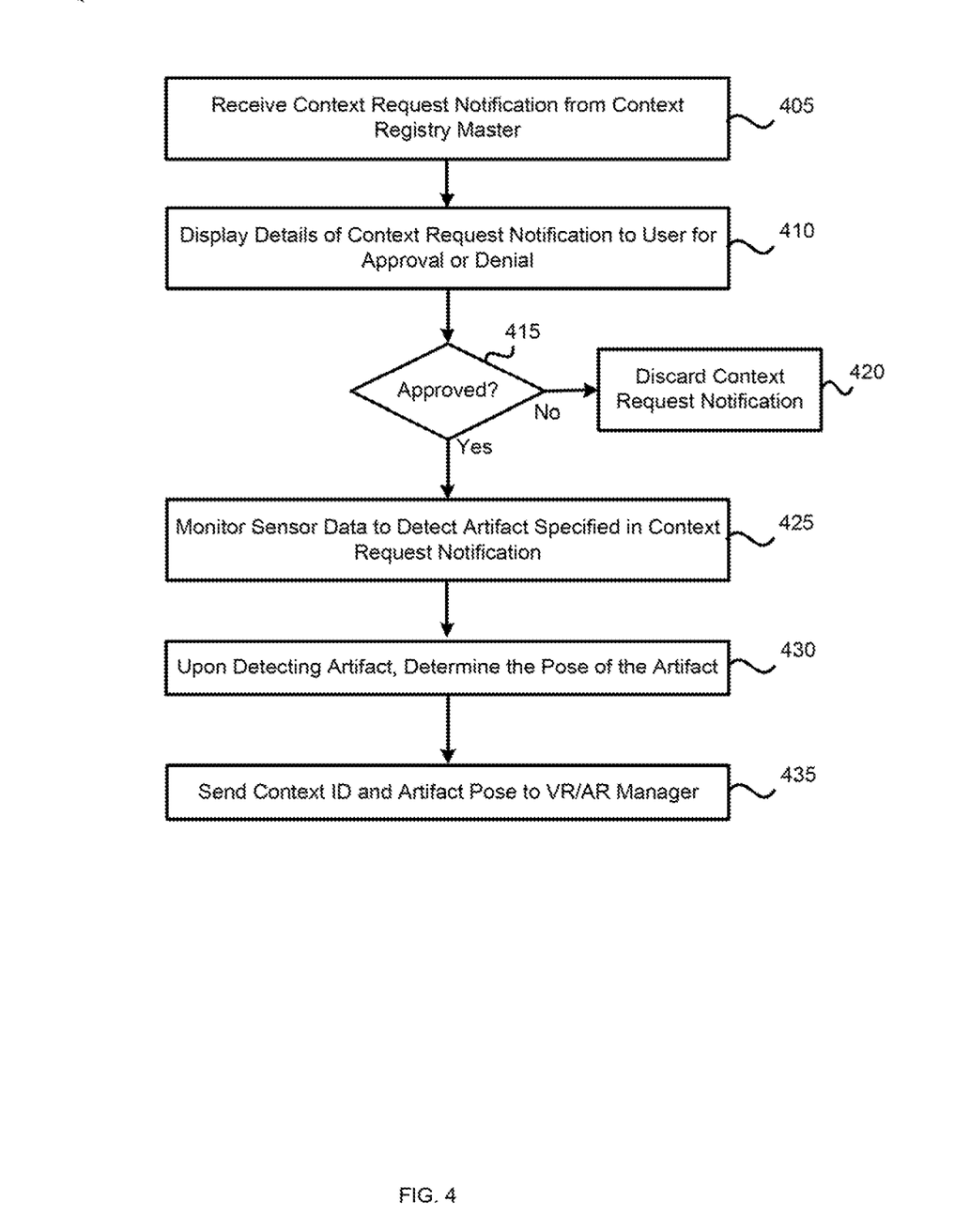
FIG. 4 illustrates additional example operations for providing a VR/AR experience, according to embodiments of the present disclosure.

FIG. 4 illustrates additional operations 400 related to providing a VR/AR experience, according to embodiments of the present disclosure.

At 405, VR/AR client 142 receives a context request notification from context registry master 134. The context request notification may, for instance, comprise context information, such as a context identifier and an image and/or description of an artifact to be detected.

At 410, VR/AR client 142 displays details of the context request notification to a user of client device 140 for approval or denial. For example, VR/AR client 142 may display a notification to the user comprising the context information, and prompting the user to approve or deny detecting the context.

At 415, VR/AR client 142 determines whether or not the user has approved the request to detect the context. If the user has not approved the request, operations continue at 420, where the context request notification is discarded. Otherwise, operations continue at 425.

At 425, VR/AR client 142 monitors sensor data (e.g., images captured through a camera associated with client device 140) to detect the artifact specified in the context request notification. In certain embodiments, VR/AR client 142 may provide the sensor data to VR/AR engine 132, which may perform context detection processing according to techniques described herein. In alternative embodiments, VR/AR client 142 may perform context detection processing.

At 430, upon detecting the artifact, VR/AR client 142 (or VR/AR engine 132) determines the pose of the artifact. For example, VR/AR client 128 may determine the coordinates and orientations of the artifact with respect to the global origin.

At 435, VR/AR client 142 (or VR/AR engine 132) sends context detection information, comprising the context identifier and the pose of the artifact, to VR/AR manager 128. As described herein, VR/AR manager 128 may then notify the requesting application that the context detection information has been received, and may generate a scene using application content received in response from the requesting application, providing the scene to VR/AR client 142.

Figure 5A:
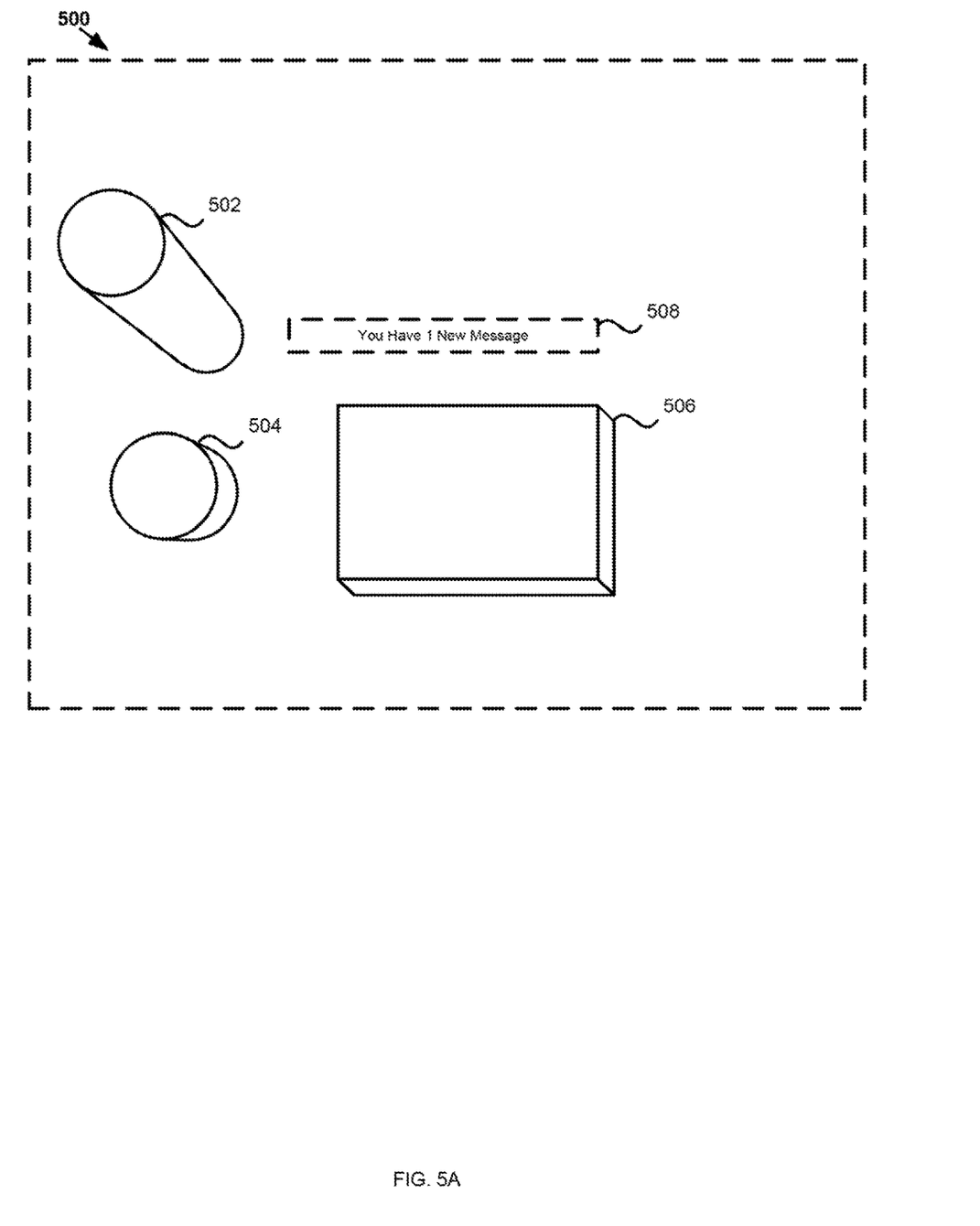
FIGS. 5A-B illustrate an example VR/AR scene comprising application content at a relative pose with respect to a detected artifact as the pose of the artifact changes.
Figure 5B:
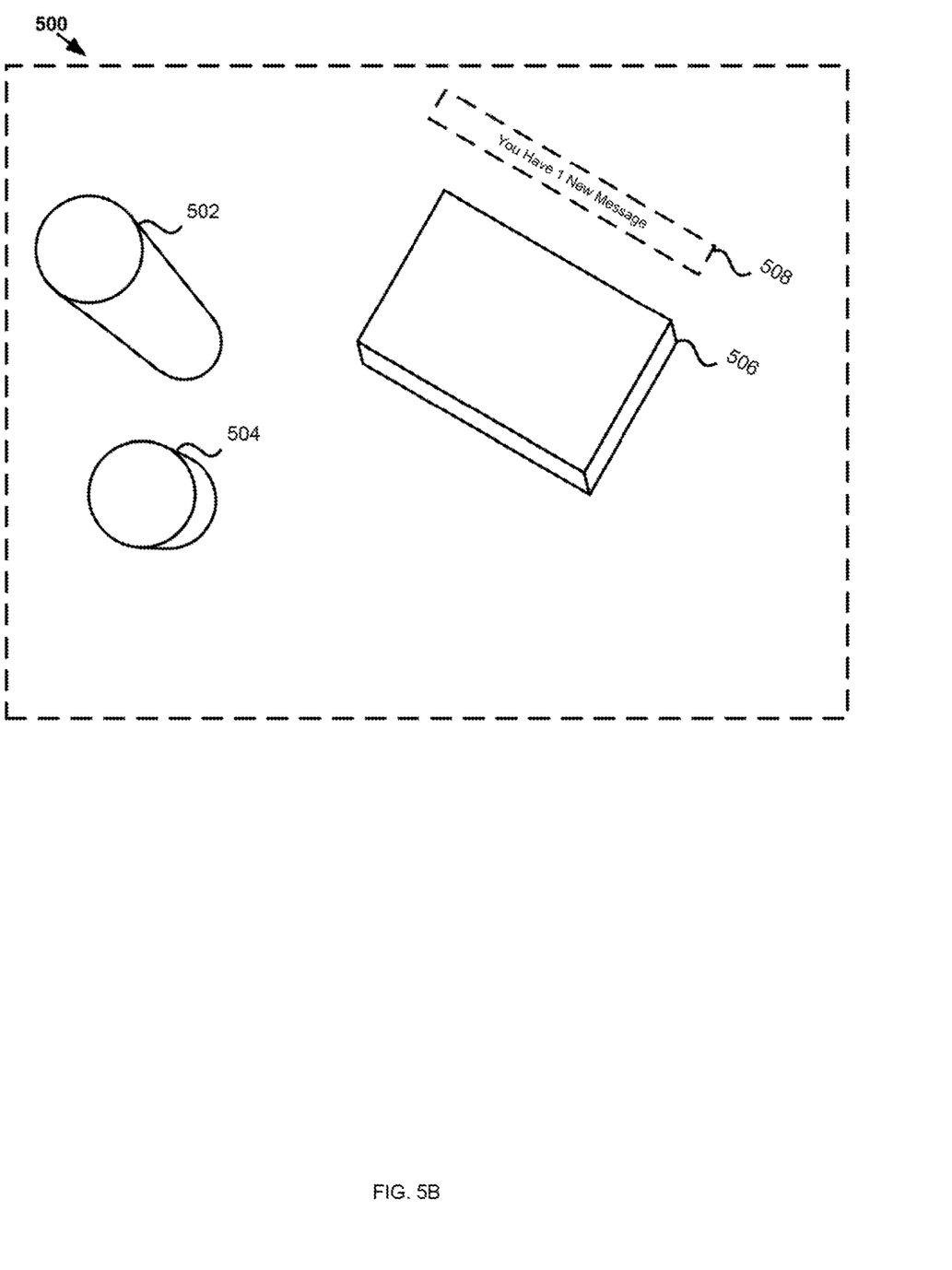

FIGS. 5A-B illustrate an example VR/AR scene 500 comprising application content 508 at a relative pose with respect to a detected artifact 506 as the pose of the detected artifact 506 changes (between FIG. 5A and FIG. 5B). VR/AR scene 500 may, for example, comprise a scene composed (at least in part) by agent composer 204 and displayed through VR/AR client 142.

As shown in FIG. 5A, VR/AR scene 500 comprises artifacts 502, 504, and 506, as well as application content 508. Artifacts 502, 504, and 506 may, for example, comprise objects in a user's environment (e.g., furniture, boxes, and the like) detected through a camera associated with client device 140. In one embodiment, a service 126 requests to register a context for detection according to techniques described herein, and the context for detection comprises artifact 506. After the context for detection has been registered, artifact 506 is detected in the user's environment, and VR/AR manager 128 receives context detection information comprising a pose of artifact 506 in the user's environment. The service 126 is notified that the context detection information has been received, and the service provides VR/AR manager 128 with application content 508 (e.g., a notification comprising the text "You Have 1 New Message") and a relative pose of application content 508 defined with respect to the pose of the artifact. VR/AR manager 128 composes a scene comprising application content 508 at its relative pose based on the pose of artifact 506. The scene is provided to client device 140, which displays VR/AR scene 500 comprising the scene received from VR/AR manager 128.

As shown in FIG. 5B, in an embodiment, the pose of application content 508 is connected to the pose of artifact 506. For example, the pose of artifact 506 may change, as shown in the difference between the pose (e.g., position, orientation, and the like) of artifact 506 in FIGS. 5A and 5B. When VR/AR manager 128 receives a new pose of artifact 506, it updates the scene with application content 508 included at its relative pose based on the new pose of artifact 506 (as shown). The updated scene is provided to client device 140, which displays the new scene in VR/AR scene 500. As such, application content 508 appears to follow artifact 506 as artifact 506 moves in VR/AR scene 500. In one embodiment, for example, application content 508 comprises a notification displayed in the air above a box (artifact 506) in the user's environment. As described above, the relative pose of application content 508 may alternatively be defined with respect to a global origin or with respect to a plurality of artifacts. Application content 508 may also change over time (e.g., the text, size, pose, and the like may change). Furthermore, VR/AR scene 500 may also include application content from a plurality of applications (e.g., services 126 and applications in containers 127).

Embodiments of the present disclosure may be useful in a vast number of contexts, as they allow for a VR/AR experience of applications and services which do not natively support VR or AR, and which may be too resource-intensive for VR/AR functionality to be implemented primarily on user devices with limited resources such as wearable AR displays or mobile phones. Embodiments may be useful, for example, in environments where traditional displays and input devices are inconvenient, such as hospitals, security and defense contexts, research labs, and space facilities (e.g., the International Space Station). Additionally, in such environments, physical space may be limited and users may have difficulty providing traditional input, allowing application content such as notifications or graphics to be rendered into the user's environment so that the user can view and interact with application content in a more dynamic fashion may significantly improve the user's experience of applications. Furthermore, allowing content from multiple applications to be rendered as an integrated augmented reality experience to be viewed and interacted with by one or more users of one or more devices may allow for increased collaboration between users and between applications. Embodiments of the present disclosure may be applicable to the Internet of Things (IoT), as content associated with a plurality of IoT entities may be rendered into the environments of one or more users as a VR/AR experience.

Furthermore, because embodiments of the present disclosure involve the abstraction of VR/AR functionality away from applications and individual client devices, they may allow multiple users to collaborate in a VR/AR experience of a single application. For example, multiple client devices may receive scene images comprising the same application content associated with a service 126, which may be continuously updated at all client devices based on user input received from all client devices, thus providing a unified collaborative VR/AR experience of the service 126. In some embodiments, for example, a user may share content of an application running on a virtual machine with a user of another client device, and both users may view and interact with the virtual machine application content through a shared augmented reality experience.

Additionally, embodiments of the present disclosure may allow for improved security and privacy, as users are enabled to approve or deny requests to detect contexts in the users' environment. For example, a user may only wish to share certain context information with certain applications, and may only approve requests from these certain applications to detect these certain contexts. In alternative embodiments, a user may specify in advance which applications may access which context information.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The computer readable media may be non-transitory. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for providing an augmented reality experience, comprising:
   receiving, by a computing device, a request from an application to register a context for detection, wherein the context for detection comprises an artifact and a context identifier;
   sending, by the computing device, the context for detection to a registration component, wherein the registration component registers the context for detection;
   receiving, by the computing device, context detection information from a client device, wherein the context detection information comprises the context identifier and a pose of the artifact;
   sending, by the computing device, a notification to the application that the context detection information was received;
   receiving, by the computing device, application content and a relative pose of the application content from the application, wherein the relative pose of the application content is defined with respect to either:
      the pose of the artifact; or
      a global origin;
   composing, by the computing device, a scene based on the application content and the relative pose of the application content; and
   transporting, by the computing device, the scene to the client device, wherein the client device displays the scene.

2. The method of claim 1, wherein, when the registration component registers the context for detection, the client device is prompted to approve the context for detection.

3. The method of claim 1, wherein the application content comprises a graphical object.

4. The method of claim 1, wherein the application content comprises a notification.

5. The method of claim 1, wherein the scene comprises application content from a plurality of applications.

6. The method of claim 5, wherein the scene is transported to a plurality of client devices, and wherein each of the plurality of client devices displays the scene.

7. The method of claim 1, wherein the request from an application to register a context for detection further comprises a context scope, and wherein, upon receiving, by the computing device, the context detection information from the client device, the method further comprises:
   determining whether the context scope is public, pool, or private;
   upon determining that the context scope is public: sending, by the computing device, a notification that the context detection information was received to each application of a plurality of applications associated with the computing device;
   upon determining that the context scope is pool: sending, by the computing device, a notification that the context detection information was received to a subset of the plurality of applications associated with the computing device, wherein the subset is specified in the context scope; and
   upon determining that the context scope is private: sending no additional notifications that the context detection information was received to any applications other than the application.

8. A non-transitory computer readable medium comprising instructions to be executed in a computer system, wherein the instructions when executed in the computer system perform a method for providing an augmented reality experience, comprising:
   receiving, by a computing device, a request from an application to register a context for detection, wherein the context for detection comprises an artifact and a context identifier;
   sending, by the computing device, the context for detection to a registration component, wherein the registration component registers the context for detection;
   receiving, by the computing device, context detection information from a client device, wherein the context detection information comprises the context identifier and a pose of the artifact;
   sending, by the computing device, a notification to the application that the context detection information was received;
   receiving, by the computing device, application content and a relative pose of the application content from the application, wherein the relative pose of the application content is defined with respect to either:
      the pose of the artifact; or
      a global origin;
   composing, by the computing device, a scene based on the application content and the relative pose of the application content; and
   transporting, by the computing device, the scene to the client device, wherein the client device displays the scene.

9. The non-transitory computer readable medium of claim 8, wherein, when the registration component registers the context for detection, the client device is prompted to approve the context for detection.

10. The non-transitory computer readable medium of claim 8, wherein the application content comprises a graphical object.

11. The non-transitory computer readable medium of claim 8, wherein the application content comprises a notification.

12. The non-transitory computer readable medium of claim 8, wherein the scene comprises application content from a plurality of applications.

13. The non-transitory computer readable medium of claim 8, wherein the scene is transported to a plurality of client devices, and wherein each of the plurality of client devices displays the scene.

14. A computer system, wherein system software for the computer system is programmed to execute a method for providing an augmented reality experience, comprising:
   receiving, by a computing device, a request from an application to register a context for detection, wherein the context for detection comprises an artifact and a context identifier;

sending, by the computing device, the context for detection to a registration component, wherein the registration component registers the context for detection;

receiving, by the computing device, context detection information from a client device, wherein the context detection information comprises the context identifier and a pose of the artifact;

sending, by the computing device, a notification to the application that the context detection information was received;

receiving, by the computing device, application content and a relative pose of the application content from the application, wherein the relative pose of the application content is defined with respect to either:
 the pose of the artifact; or
 a global origin;

composing, by the computing device, a scene based on the application content and the relative pose of the application content; and transporting, by the computing device, the scene to the client device, wherein the client device displays the scene.

15. The computer system of claim 14, wherein, when the registration component registers the context for detection, the client device is prompted to approve the context for detection.

16. The computer system of claim 14, wherein the application content comprises a graphical object.

17. The computer system of claim 14, wherein the application content comprises a notification.

18. The computer system of claim 14, wherein the scene comprises application content from a plurality of applications.

19. The computer system of claim 14, wherein the scene is transported to a plurality of client devices, and wherein each of the plurality of client devices displays the scene.

20. The computer system of claim 14, wherein the request from an application to register a context for detection further comprises a context scope, and wherein, upon receiving, by the computing device, the context detection information from the client device, the method further comprises:
 determining whether the context scope is public, pool, or private;
 upon determining that the context scope is public: sending, by the computing device, a notification that the context detection information was received to each application of a plurality of applications associated with the computing device;
 upon determining that the context scope is pool: sending, by the computing device, a notification that the context detection information was received to a subset of the plurality of applications associated with the computing device, wherein the subset is specified in the context scope; and
 upon determining that the context scope is private: sending no additional notifications that the context detection information was received to any applications other than the application.

* * * * *